(12) United States Patent
Chandra (10) Patent No.: US 8,429,002 B2
(45) Date of Patent: Apr. 23, 2013

(54) APPROACHES FOR ENFORCING BEST PRACTICES AND POLICIES THROUGH COMPUTERIZED PROCESSES

(75) Inventor: Saurabh Chandra, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 494 days.

(21) Appl. No.: 12/415,566

(22) Filed: Mar. 31, 2009

(65) Prior Publication Data

US 2010/0250342 A1    Sep. 30, 2010

(51) Int. Cl.
*G06Q 10/00* (2006.01)
*G06Q 30/00* (2006.01)

(52) U.S. Cl.
USPC ...... 705/7.39; 705/7.23; 705/14.2; 705/26.64

(58) Field of Classification Search ................. 705/7.23, 705/7.39, 14.2, 26.64
See application file for complete search history.

(56) References Cited

U.S. PATENT DOCUMENTS

| | | | | |
|---|---|---|---|---|
| 5,731,991 A * | 3/1998 | Kinra et al. | | 702/186 |
| 6,236,990 B1 * | 5/2001 | Geller et al. | | 1/1 |
| 7,315,826 B1 * | 1/2008 | Guheen et al. | | 705/7.29 |
| 7,930,201 B1 * | 4/2011 | Issa et al. | | 705/7.23 |
| 2002/0042731 A1 * | 4/2002 | King et al. | | 705/10 |
| 2002/0049621 A1 * | 4/2002 | Bruce | | 705/7 |
| 2003/0004766 A1 * | 1/2003 | Sandoval et al. | | 705/7 |
| 2003/0023538 A1 * | 1/2003 | Das et al. | | 705/37 |
| 2005/0171831 A1 * | 8/2005 | Johnson et al. | | 705/10 |
| 2006/0004596 A1 * | 1/2006 | Caniglia et al. | | 705/1 |
| 2008/0271022 A1 * | 10/2008 | Strassner et al. | | 718/100 |
| 2009/0254391 A1 * | 10/2009 | Sarkar et al. | | 705/7 |

* cited by examiner

*Primary Examiner* — Lynda Jasmin
*Assistant Examiner* — Sujay Koneru
(74) *Attorney, Agent, or Firm* — Silicon Valley Patent Group LLP; Omkar Suryadevara

(57) ABSTRACT

Approaches for employing computerized processes to conform the behavior of users to a set of best practices and policies is provided. In an approach, a tool for use in performing a desired task may be identified. A plurality of characteristic values is stored, on a machine-readable medium, for each of a plurality of tools. Each of the plurality of characteristic values identifies a number that reflects how much the tool associated with the characteristic value supports a particular characteristic. A score for each of the plurality of tools is computed. The score for each tool is the sum of the characteristic values that are associated with each tool. Thereafter, display data that describes how to render a pictorial representation, which uses the scores in depicting a relative measure of how appropriate each of the plurality of tools is for the desired task, may be transmitted to a client.

21 Claims, 6 Drawing Sheets

FIG. 1

| S.No | Category | Numeric score [weighted Total] | | |
|---|---|---|---|---|
| | | QTP | WinRunner | Silktest |
| 1 | Tool coverage while executing Oracle apps | 4,265 | 4030 | 2,785 |
| 2 | Tool coverage while executing Peoplesoft apps | 4,265 | 4030 | 2,785 |
| 3 | Tool coverage while executing Siebel apps | 4,265 | 4030 | 2,785 |
| 4 | Tool coverage while executing html based apps | 4,265 | 4030 | 2,785 |
| 5 | Tool coverage while recording/playback peoplesoft apps | 4,315 | 4030 | 2,785 |
| 6 | Tool coverage while recording Siebel apps | 4,315 | 4030 | 2,785 |
| 7 | Tool coverage while recording Oracle apps | 4,315 | 4030 | 2,785 |
| 8 | Tool coverage while recording html apps | 4,315 | 4030 | 2,785 |
| 9 | Platform Porting / Desktop Configuration / Client Testing Portability by the tool | 715 | 715 | 340 |
| 10 | Reporting of Testing Results by the tool | 570 | 520 | 100 |
| 11 | Fault Management / Defect Tracking mechanism of the tool | 140 | 70 | 0 |
| 12 | Installation / Upgrade and Usage | 190 | 199 | 50 |
| 13 | Tool's vendor services and support | 430 | 315 | 235 |
| 14 | Total Numeric weight/tool | 36,365 | 34,050 | 23,005 |

| Evaluation weighted score allocation criteria | Value |
|---|---|
| Fully supports requirement | 100 |
| Partially supports requirements | 50 |
| Does not support requirement | 0 |
| Unknown or Not Tested | ? |

APPROACHES FOR ENFORCING BEST PRACTICES AND POLICIES THROUGH COMPUTERIZED PROCESSES

FIELD OF THE INVENTION

The present invention relates to enforcing best practices and policies through computerized processes.

BACKGROUND OF THE INVENTION

The term "best practice" refers to an idea that there is a technique, method, process, or activity, which is more effective at delivering a particular outcome than any other technique, method, process, etc. Best practices are used to deliver a desired outcome with fewer problems and unforeseen complications through standardized processes, checks, and testing. Best practices can also be defined as the most efficient (least amount of effort) and effective (best results) way of accomplishing a task, based on repeatable procedures that have proven themselves over time for large numbers of people.

A business will often seek to ensure that their employees follow the best practices of the business. Many businesses choose to enact rules or policies to ensure that their employees follow their best practices.

However, even if a business chooses to enact a policy regarding the conduct of their employees to promote the best practices of the business, the business may still find it difficult to enforce its best practices because different people have different experiences, knowledge, skill sets, and ideas about what is best. As a result, different people, either deliberately or unknowingly, may conduct themselves in conflict with the best practices of the business. Moreover, employees of a business may come and go, and so it is often difficult to ensure that all employees of the business are trained on and have knowledge of the best practices and policies of the business.

Despite the difficulties in doing so, it is important for businesses to ensure that their best practices and policies are followed in a consistent manner by their employees, to ensure that employees act in an effective, rather than an ad-hoc, manner.

SUMMARY OF THE INVENTION

Techniques are provided for employing computerized processes to conform the behavior of users to a set of best practices and policies. For example, embodiments of the invention may be used to conform the behavior of a group of users to a set of best practices and policies which concern automation testing. The best practices and policies may indicate that only tools that are most appropriate and useful for a particular task should be used. According to one embodiment of the invention, a system may be used to identify a tool for use in performing a particular task. In this way, a business or organization may ensure that its employees or members are using the most appropriate and useful tool in the performance of a task.

In an embodiment, a system maintains data that identifies a plurality of task categories. Each of the plurality of task categories corresponds to a particular type of task. Each task category may be associated with a different set of characteristics in which tools that are designed to perform tasks in that task category exhibit.

According to an embodiment, a plurality of characteristic values is stored for each of a plurality of tools to be considered for use in performing tasks in a particular task category. Each of the plurality of characteristic values may identify a number that reflects how much the tool associated with the characteristic value supports a particular characteristic that a tool may have in performing the particular task. For example, the lower a characteristic value of a tool is, the less the tool supports the particular characteristic associated with the characteristic value. On the other hand, the higher the characteristic value of a tool, the more the tool supports the particular characteristic associated with the characteristic value.

A score for each of the plurality of tools under consideration is computed. The score for each tool is the sum of the characteristic values that are associated with each tool. Thus, the higher the score is for a particular tool, the more appropriate or useful the tool is for performing task in the task category in which the tool belongs.

To identify which tool should be used for a particular task in accordance with the best practices and policies of a business or organization, a user may issue a request, which identifies a task category, to a server from a client. The request may be issued by a user configuring a user interface of a client. Thereafter, display data that describes how to render a pictorial representation on the user interface may be transmitted to the client from the server. Using the display data, the client may render the pictorial representation on the user interface of the client. The pictorial representation, such as a graph, chart, or illustration, uses the scores in depicting a relative measure of how appropriate each of the plurality of tools is for the identified task category. In this way, a user may quickly ascertain which of the tools under consideration is most appropriate or useful for the desired task. The user interface of the client may also depict additional information about the characteristic values of the tools under consideration so the user may make an informed decision about which tool is most appropriate for use for his or her desired task based upon the strengths and weaknesses of each tool under consideration.

While a user is responsible for making an informed decision based upon the information displayed on and provided by the user interface of the client, such information enables the user to select the most appropriate or useful tool for his or her desired task; consequently, the best practices and policies of the business or organization may require that employees or members, in certain circumstances, use embodiments of the invention to ensure an appropriate and useful tool is selected for use in performing certain tasks.

According to another embodiment of the invention, policy data that describes a plurality of policies which are intended to be followed by a set of test scripts is stored in a machine-readable medium. Each of the set of test scripts, when executed, may be used to test the speed or functionality of an application.

In an embodiment, a user may instruct a software process to examine, without human assistance, a particular test script to determine if the particular test script complies with each of the policies described by the policy data. When the software process determines that the particular test script does not comply with a particular policy described by the policy data, the software process may cause a user interface of a client to display a visual indication that the particular test script does not comply with the particular policy. Additionally, the software process may present a series of questions to a user to solicit responses, from the user, which will be used to determine whether any of the policies described by the policy data have been violated. In this way, a user may interact with the software process to ensure that a particular test script is in full compliance with all the policies described by the policy data.

Additional embodiments of the invention shall be described in further detail in the detailed description which follows; consequently, the description of the embodiments in this section is not intended to be comprehensive or suggestive of all embodiments of the invention.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 3 is an illustration of a user interface displaying characteristic values according to an embodiment of the invention;

DETAILED DESCRIPTION OF THE INVENTION

Approaches for employing computerized processes to conform the behavior of users to a set of best practices and policies are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Architecture Overview

Figure 1:
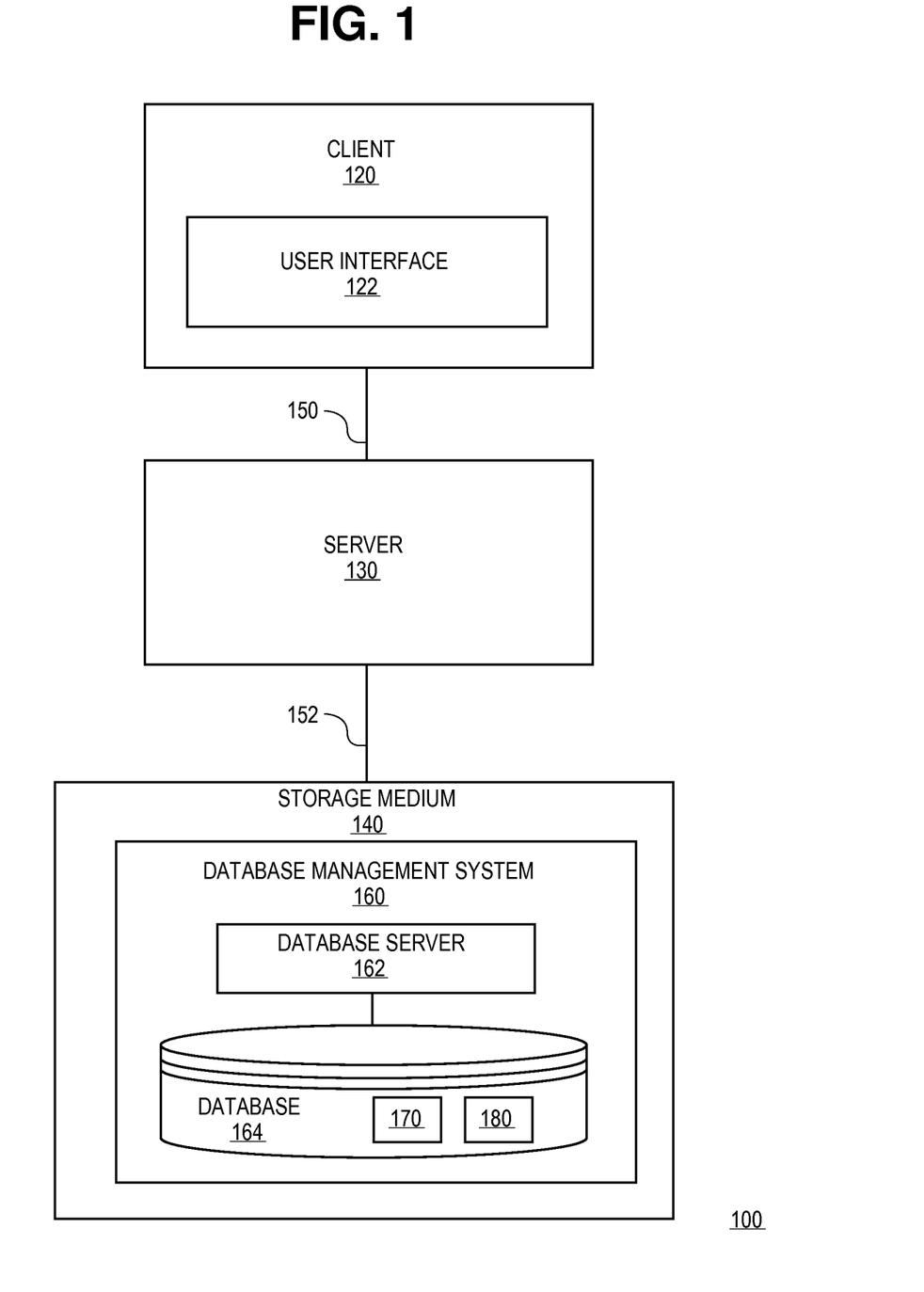
FIG. 1 is a block diagram of a system according to an embodiment of the invention.

FIG. 1 is a block diagram of a system 100 according to an embodiment of the invention. System 100 may be used to employ computerized processes to conform the behavior of users to a set of best practices and policies. For example, system 100 may be used to identify a tool for use in performing a particular task to ensure tool usage conforms to a set of best practices and policies. As another example, system 100 may be used to ensure that a set of test scripts conforms to a set of best practices and policies. System 100 includes client 120, server 130, storage medium 140, and communications links 150 and 152. Each of these components shall be discussed in more detail below.

Client 120, as broadly used herein, represents any hardware or software entity capable of presenting a user interface, such as user interface 122, to a user. Non-limiting, illustrative examples of client 120 include a web browser, a cell phone, a personal digital assistance (PDA), a wireless device, or a software application. While only one client is depicted in the embodiment shown in FIG. 1 for ease of explanation, other embodiments may employ a plurality of clients.

User interface 122, as broadly used herein, represents any graphical element that is capable of depicting information to a user. For example, user interface 122 may display text and/or graphical images. User interface 122 may be incorporated as part of a display, such as a web page. User interface 122 may be capable of being configured by a user such that the user may issue one or more commands or requests to server 130 using user interface 122.

User interface 122 may be displayed on multiple clients at the same time and each client depicting user interface 122 may render user interface 122 in a different state. For example, if user interface 122 is incorporated as part of a web page, then multiple web browsers may simultaneously depict user interface 122. Each user of a web browser is free to interact and configure user interface 122 in any way they see fit. Accordingly, the particular visual representation rendered on user interface 122 may be different from client to client.

Server 130 may be implemented by any medium or mechanism that is capable of (a) responding to requests from client 120 and (b) storing data to and retrieving data from storage medium 140. In processing requests received from client 120, server 130 may retrieve data from or store data in storage medium 140.

While server 130 is depicted as a single entity in FIG. 1, embodiments of the invention may implement server 130 using two or more computerized entities working together. For example, in certain embodiments, server 130 may be implemented as a web server and an application server and/or an authentication server working together to perform the functions described herein attributable to server 130. Further, server 130 may comprise one or more software processes that operate in conjunction with one another.

Storage medium 140 may be implemented by any medium or mechanism that is capable of storing digital data. Non-limiting, illustrative examples of storage medium 140 include a database management system, a file server, and any volatile or non-volatile storage medium for digital data. For example, in the embodiment depicted in FIG. 1, storage medium 140 is implemented using database management system 160, which includes one or more database servers 162 and one or more databases 164.

Communications link 150 may be implemented by any medium or mechanism that provides for the exchange of data between client 120 and server 130. Communications link 152 may be implemented by any medium or mechanism that provides for the exchange of data between server 130 and storage medium 140. Non-limiting, illustrative examples of communications links 150 and 152 include, without limitation, a network such as a Local Area Network (LAN), Wide Area Network (WAN), Ethernet or the Internet, one or more terrestrial, satellite or wireless links, and serial or parallel printer cables.

Storage medium 140 may store a variety of data. In an embodiment, storage medium 140 stores capability data 170. Capability data 170 is digital data that describes the capabilities of one or more tools. For example, in an embodiment, capability data 170 may comprise data that identifies, for one or more tools being considered for use in performing tasks in a particular task category, a plurality of characteristic values for each tool. As another example, capability data 170 may also comprise data that identifies a score for one or more tools. Characteristic values and scores shall be discussed in further detail below in the next section.

In the embodiment depicted in FIG. 1, storage medium 140 also stores policy data 180. Policy data 180 is data that describes a plurality of policies which are intended to be followed by a set of test scripts. Policy data 180 shall be discussed in further detail below in the section entitled "Conforming a Test Script to a Set of Best Practices and Policies."

Having described an illustrative system 100 according to an embodiment of the invention, the steps performed by embodiments of the invention in processing data that may be used to identify a particular tool for use in performing a particular task shall now be discussed in additional detail.

Identifying a Tool Using Data Analysis

Figure 2:
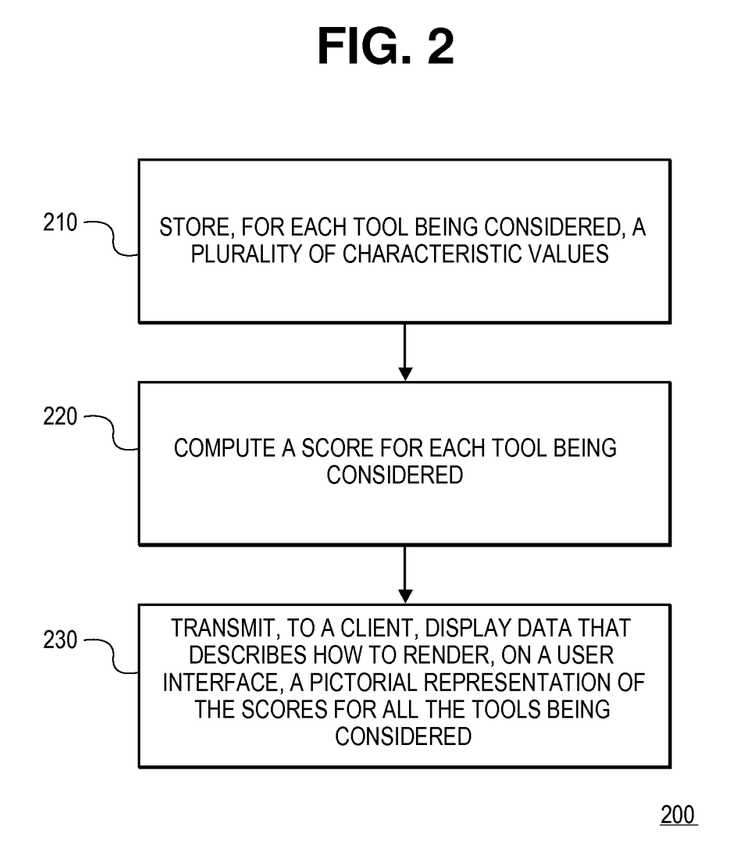
FIG. 2 is a flowchart illustrating the functional steps of identifying a particular tool for use in performing a particular task according to an embodiment of the invention.

FIG. 2 is a flowchart 200 illustrating the functional steps of identifying a particular tool, from among a plurality of tools (referred to as the "tools under consideration"), for use in performing a particular task according to an embodiment of the invention. By employing system 100 that performs the steps of flowchart 200, a business or organization may ensure that its employees or members are using the most appropriate and useful tool for each task. In this way, the business may avoid waste, inefficiency, and undue cost.

The tool to be identified by performing the steps of FIG. 2 may be used to perform a variety of different tasks. For example, the tool identified by performing the steps of FIG. 2 may correspond to a software application designed to perform a particular task, such as performing testing simulations on other software applications, managing data persistently, maintaining electronic records, or any other task which may be performed by a software application. In other embodiments of the invention, the tool identified by performing the steps of FIG. 2 may correspond to a hardware device or a physical device, such as a router, a personal computer, a multi-function printer, or a cell phone. Thus, there are no limitations on the types of tools which may be identified by performing the steps of FIG. 2 and no limitations on the types of tasks which the tool identified by performing the steps of FIG. 2 may accomplish.

In an embodiment, since the steps of flowchart 200 may be used in identifying a tool for performing a variety of different tasks, server 130 may store, within storage medium 140, data that identifies one or more task categories. Further, server 130 may store information, within storage medium 140, which identifies, for each task category, a set of tools to consider in performing tasks associated with that task category. The set of tools to be considered in performing tasks associated with a particular task category shall be referred to herein as the "tools under consideration" for that particular task category.

Referring to step 210 of FIG. 2, a plurality of characteristic values, for each of the tools under consideration, are stored for one or more task categories. The plurality of characteristic values may be stored by server 130 in storage medium 140. For example, FIG. 1 depicts capability data 170 as being stored in database 164. In the embodiment depicted in FIG. 1, the plurality of characteristic values, for each of the tools under consideration, may be stored as capability data 170 in database 164.

A characteristic value is a measure of how much a particular tool supports a particular characteristic that a tool may have in performing a particular task. In an embodiment, a characteristic value may be represented as a number that reflects how much the tool associated with the characteristic value supports a particular characteristic. The lower the numerical value of a characteristic value of a tool, the less the tool supports the particular characteristic associated with the characteristic value. On the other hand, the higher the number value of a characteristic value of a tool, the more the tool supports the particular characteristic associated with the characteristic value.

Characteristic values may describe any characteristic that a tool designed to perform a particular task may have. Illustrative, non-limiting characteristics which may be described by characteristic values include: ability to interact with software applications provided by a particular company, reporting features, services and support provided by the company providing the tool, installation and use costs, defect tracking mechanisms for the tool, and ability to interact with particular types of technology platforms.

Each tool under consideration may have a plurality of different characteristic values. The plurality of characteristic values associated with each tool under consideration describes the capabilities of the tool to accomplish a particular task. In this way, the plurality of characteristic values associated with each tool describes the advantages and disadvantages the tool has to perform a particular task.

The tools under consideration for a particular task category have the same characteristics, but may have different characteristic values for those characteristics. Tools under consideration in different task categories may have different characteristics as well as different characteristic values.

Characteristic values for a tool may be obtained or assigned in a variety of different ways. In an embodiment, characteristic values for a tool may be assigned by a user. For example, a user may use user interface 122 to assign at least a portion of the characteristic values associated with a particular tool. In this example, the user may configure user interface 122 to select a particular tool, display the characteristics associated with the selected tool, and view any characteristic values associated with the characteristics of the particular tool. The user may configure user interface 122 to update a particular characteristic value to a new value by causing client 120 to issue a request to server 130 to update the particular characteristic value to the new value identified in the request. Upon receiving the request, server 130 may instruct storage medium 140 to update capability data 170 so that the particular characteristic value is assigned the new value identified by the request.

According to another approach, a user may configure user interface 122 to add a new tool to the set of tools under consideration for a particular task category. Thereafter, the user may configure user interface 122 to assign characteristic values for the newly added tool.

In another embodiment, characteristic values may be assigned by parties or entities other than the user using system 100 to identify a particular tool. In such an embodiment, at least a portion of the characteristic values assigned to one or more tools under consideration may be assigned by an administrator of system 100 or a third party. For example, a business or organization may instruct a particular set of people to assign characteristic values to tools under consideration. In this way, the business or organization may have control over the veracity of the characteristic values to ensure the best practices and policies of the business or organization are followed. Further, in an embodiment, at least a portion of the plurality of characteristic values of tools under consideration is stored in storage medium 140 prior to server 130 receiving any requests, from client 120, for data describing how to render, on user interface 122, a pictorial representation of the scores associated with each of the tools under consideration for a particular task category. In this way, the characteristic values for tools under consideration may be established and reviewed by appropriate personal at a business or organization prior to users of system 100 accessing the data.

After storing characteristic values for at least a portion of the tools under consideration for each task category, processing proceeds to step 220.

In step 220, a score for each of the tools under consideration in each task category is computed. A score is a measure of how useful or appropriate a particular tool under consideration is for tasks in the task category in which the particular tool belongs. In an embodiment, server 130 computes a score for each of the tools under consideration.

In an embodiment, server 130 may compute a score for a particular tool under consideration by adding together all the characteristic values of the particular tool. In such an embodiment, the higher the score for a particular tool, the more useful or appropriate the tool under consideration is deemed to be for performing tasks in the particular task category identified by the user. After computing a score for each tool under consideration in each task category, processing proceeds to step 230.

In step 230, a user may use client 120 to identify a particular tool for use in performing a particular task. To identify which tool the user should use, the user may use client 120 to issue a request to server 130 for information about the tools under consideration for the task in which the user is interested. For example, the request sent from client 120 to server 130 may identify the particular task category associated with the task the user is interested in performing.

In response to receiving the request from client 120, server 130 may transmit, to client 120, display data that describes how to render, on user interface 122, information about each of the tools under consideration in the particular task category in which the user is interested. The information about each of the tools under consideration may provide a relative measure of how appropriate each of the tools under consideration is for the desired task. For example, the information may contain information about the characteristic values and/or the scores of each tool under consideration in the particular task category in which the user is interested.

Figure 4:
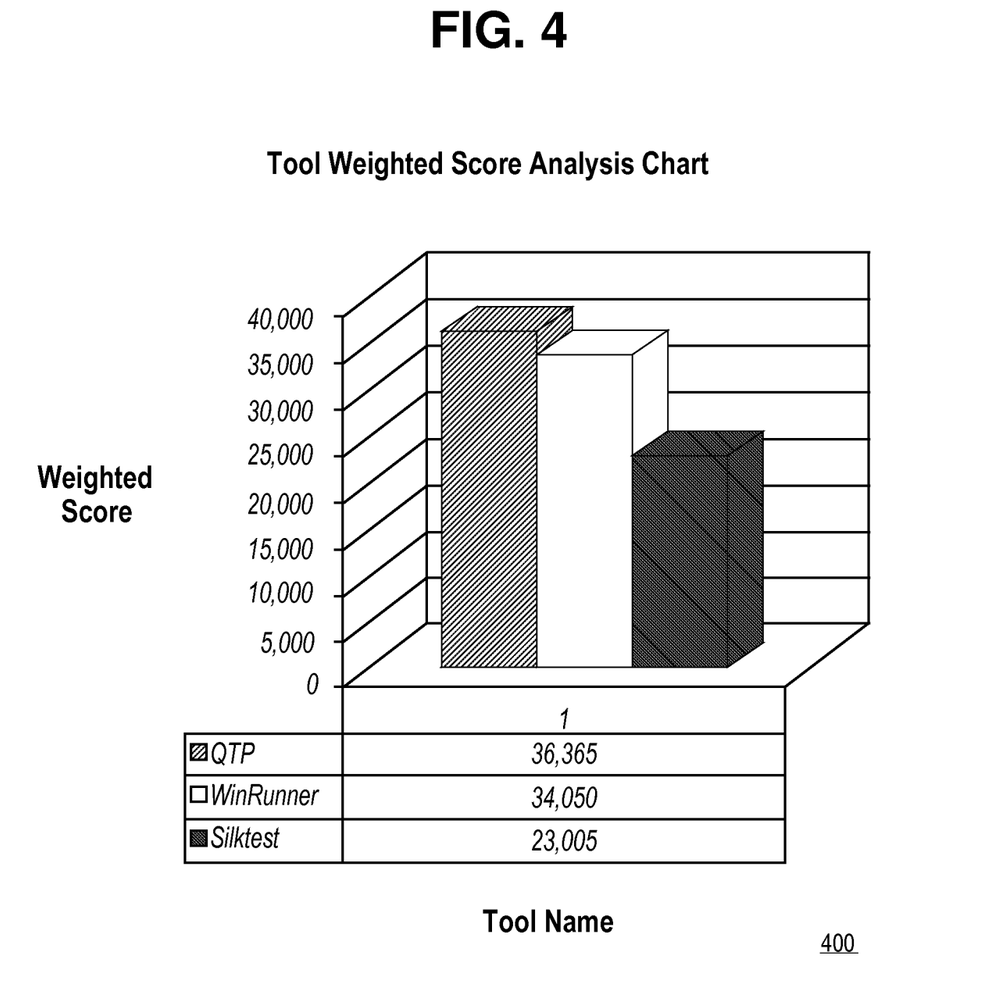
FIG. 4 is a pictorial representation of scores associated with several tools under consideration according to an embodiment of the invention.

For an example of the information that may be displayed on user interface 122 in response to a user requesting information about the tools under consideration in a particular task category, consider FIGS. 3 and 4. FIG. 3 is an illustration 300 of a user interface displaying characteristic values according to an embodiment of the invention. FIG. 4 is a pictorial representation 400 of scores associated with several tools under consideration according to an embodiment of the invention. Illustration 300 and/or pictorial representation 400 may be displayed on user interface 122 in an embodiment.

The information depicted by FIGS. 3 and 4 may be used by a user to make an informed decision, thereby enabling the user to select the most appropriate and effective tool for a particular task. The best practices and policies of a business or organization may require a user to use system 100 when making a decision about which tool to use for certain tasks.

FIG. 3 depicts the values of the scores 310 associated with tool 320, tool 322, and 324. FIG. 3 also depicts a table that describes the characteristic values for characteristics of tools 320, 322, and 324. Each row of the table is associated with a different characteristic of a tool. For example, row 330 is associated with the tool's interoperability with applications from a first vendor, row 332 is associated with the tool's interoperability with applications from a second vendor, and row 334 is associated with the tool's interoperability with applications from a third vendor. The characteristic value for tools 320, 322, and 324 for the characteristic associated with row 330 is 4,265, 4,030, and 2,785 respectively.

In an embodiment, the particular tool that the user should select, from among the tools under consideration, for use in performing a particular task is the tool which has the highest score. The tool having the highest score may be identified by viewing the score values (such as those shown in FIG. 3) or by viewing a pictorial representation of the scores of all the tools under consideration (such as shown in FIG. 4). However, a user may view information about the strengths and weaknesses of each tool under consideration. Based on this information, the user may select a particular tool for use in performing a particular task which does not have the highest score, but is better suited for the user's desired task.

Characteristics values are assigned to reflect how much a particular tool supports the characteristic associated with the characteristic value. In the embodiment depicted in FIG. 3, area 340 describes a suggested value for the characteristic values to be assigned to a particular characteristic. In the example of FIG. 3, if a particular tool full supports a characteristic, then it is assigned a characteristic value of 100, if a particular tool partially supports a characteristic, then it is assigned a characteristic value of 50, if a particular tool does not support a characteristic, then it is assigned a characteristic value of 0, and if it is not known whether a particular tool full supports a characteristic, then it is not assigned a characteristic value or assigned a null value. The suggested values in area 340 are only indicative of one embodiment, as other embodiments of the invention may employ different approaches or schemes for assigning characteristic values.

In an embodiment, each of the characteristics of tools under consideration in a particular task category may have one or more child characteristics. For example, a high level characteristic (analogous to the top level node of a tree) may have one or more child characteristics (analogous to child nodes of the top level node of a tree) that fall under the scope of the high-level characteristic, and in turn, each of those one or more child characteristics may themselves have one or more child characteristics (analogous to child nodes of the child nodes of the top level node of a tree), and so on. Thus, in an embodiment, user interface 122 may display a characteristic value that represents a hierarchical structure of other characteristics values. The user may drill down on the high level characteristic value (for example, by clicking of the high level characteristic value) to see additional information about the characteristic values organized underneath the high level characteristic value. A high level characteristic value may have a value equal to the sum of all the characteristic values beneath it. For example, the characteristic associated with row 330 may have a number of child characteristics. The sum of all the characteristic values of child characteristics of the characteristic associated with row 330 is 4,265 for tool 320, 4,030 for tool 322, and 2,785 for tool 324, as shown in FIG. 3.

As other example, in FIG. 3, assume characteristic 336 is a high level characteristic that has two child characteristics, namely "Installation," and "Upgrade and Usage." If, for a particular tool, the characteristic value for the Installation characteristic is 100, and the characteristic value for the Upgrade and Usage characteristic is 90, then the characteristic value for characteristic 336 is 190, which is the sum of the two child characteristics. If the user updates, for a particular tool, a characteristic value for the Upgrade and Usage characteristic to 80 from 90, then the characteristic value for characteristic 336 would be automatically updated to be 180, which is the sum of the two child characteristics. If the user selects the characteristic value of tool 320 for characteristic 336 (the value of which is shown as 190 in FIG. 3), then user interface 122 may be updated to depict information about the characteristic values for any child characteristics of characteristic 336, which in this example would be the Installation characteristic and the Upgrade and Usage characteristic.

In an embodiment, when a weight associated with a child characteristic of parent characteristic is changed, then the display of any information, such as a pictorial representation, on user interface 122 may be updated by server 130 to reflect a change in a characteristic value associated with the child characteristic (which would result as a consequence of the change in weight of the child characteristic). Such an update may cause information about the characteristic value associated with the parent characteristic to change, as characteristic values for the parent characteristic will change due to the change in characteristic values associated with the child characteristic.

In an embodiment, if the set of characteristic values associated with a tool under consideration is updated while user interface 122 is displaying information about the tool under consideration, then the user interface 122 may be dynamically updated to reflect the changes made to the characteristic values of the tool under consideration. For example, if an administrator of system 100 using client 120 updates a characteristic value of a tool under consideration, and if user interface 122 is displaying information about the tool under consideration, then the information displayed may be dynamically updated to reflect this change, even if the information comprises a pictorial representation, such as a graph or chart. To illustrate, pictorial representation 400 of the scores associated with several tools under consideration may be dynamically updated in response to a change in the characteristic values of one of the tools under consideration depicted in pictorial representation 400.

In an embodiment, each characteristic may be assigned a weight value that indicates the relative importance of the characteristic. The weight associated with a particular characteristic may be used in determining the characteristic values associated with the characteristic. For example, by default, all characteristics may be assigned a value of 1. If a characteristic is assigned a value of 2, then the characteristic may be deemed to be twice as important as other characteristics, and characteristic values for the characteristic may be doubled. On the other hand, if a characteristic is assigned a value 0.5, then the characteristic may be deemed to be half as important as other characteristics, and characteristic values for the characteristic may be reduced by 50%. The above examples are merely illustrative, as there are many different ways of expressing a weight for a characteristic. In an embodiment, a user may assign a weight to a particular characteristic by submitting configuration data through user interface 122 to server 130. The configuration data submitted by the user to server 130 identifies a particular characteristic and the weight to be assigned to the particular characteristic. After receiving the configuration data, server 130 will adjust any characteristic values assigned to a particular characteristic to reflect the weight of the particular characteristic.

In an embodiment, when server 130 receives configuration data from a user that changes a weight associated with a particular characteristic, server 130 transmits data to client 120 that enables user interface 122 to update the information displayed thereon to reflect the change in the weight associated with the particular characteristic. For example, user interface 122 may be updated to display the new weight value for a characteristic or a graphic, such as the pictorial representation 400 of scores associated with several tools under consideration depicted in FIG. 4, may be dynamically updated to depict the new characteristic values and/or scores associated with tools under consideration as a result of the change in the weight values for one or more characteristics.

In an embodiment, the display data sent from server 130 to client 120 in step 230 may describes how to render, on user interface 122, any characteristic values for any tools under consideration for the desired task category, including those characteristic values which may not be immediately displayed upon user interface 122. For example, certain characteristic values of child characteristics may not be displayed to the user on user interface 122 until the user configures user interface 122 to display those additional details. However, in an embodiment, server 330 may provide client 120 information about as yet undisplayed characteristic values so that if the user configures user interface 122 in a manner that requires their display, then client 120 may update the display of user interface 122 to depict the previously undisplayed characteristic values without making an additional request for such information to server 130. In this way, the user of client 120 may avoid the delay in client 120 retrieving the information from server 130 that is required to display the information about the characteristic values on user interface 122.

Advantageously, by employing system 100, a business or organization may ensure that its employees or members are using the most appropriate and useful tool for each task. For example, characteristic values of tools under consideration may consider (a) what licensing policies or terms of a tool are acceptable, (b) with what technology a tool should be able to interact, (c) what types of analysis a tool should be able to provide, (d) what type of support the company providing the tool should offer, and/or (e) how stable a company providing the tool should be. In this way, waste, inefficiency, and undue cost may be avoided by ensuring the tool used for a particular task is most appropriate and useful. Further, since the decision making process for determining which tool is most appropriate and useful is aided by employing system 100, a business or organization may be assured that decisions are not made in an ad-hoc manner, but reflect the concerns of the business or organization.

Conforming a Test Script to a Set of Best Practices and Policies

Figure 5:
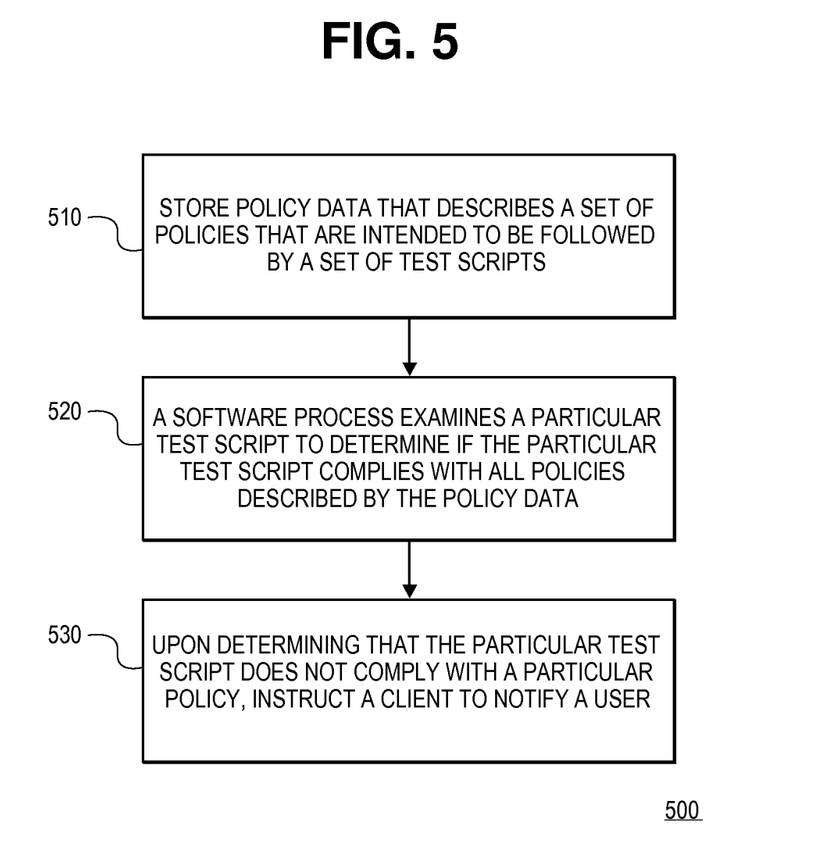
FIG. 5 is a flowchart illustrating the functional steps of testing a tool for use in performing a particular task according to an embodiment of the invention.

FIG. 5 is a flowchart 500 illustrating the functional steps of testing a tool for use in performing a particular task according to an embodiment of the invention. By employing system 100 that performs the steps of flowchart 500, a business or organization may ensure that its employees or members are using a test script that conforms to the best practices and policies of the business or organization. In this way, the business or organization may avoid waste, inefficiency, and undue cost.

In step 510, policy data that describes a set of policies that are intended to be followed by a set of test scripts is stored. In an embodiment, server 330 may perform step 510 by storing policy data 180 in storage medium 140. A test script, as used herein, refers to any script, program, or machine executable set of instructions designed to test a software program. Test scripts may be used to test the speed or functionality of an application.

Policy data 180 is data that describes a plurality of policies which are intended to be followed by a set of test scripts. The purpose of the policies is to ensure that the best practices of a business or organization are followed by the set of test scripts. Thus, each of the set of policies described by policy data 180 defines a rule, which test scripts should follow, to ensure the best practices of a business or organization are followed.

A user, such as an administrator of system 100, may use client 120 to interact with server 130 to define the policies described by policy data 180 and subsequently store policy data 180 in storage medium 140. For example, a user may define one or more policies using user interface 122 and thereafter use user interface 122 to send a request to server 130 that requests the one or more policies, defined by the user in user interface 122, be stored in policy data 180 in storage medium 140. Similarly, a user may update policies described by policy data 180, delete policies described by policy data 180, or add new policies to the policies described by policy data 180 using user interface 122 to send a request to server 330 to perform the required action.

Non-limiting, illustrative policies which may be described by policy data 180 include (a) a policy indicating that any reference to a particular date should be performed by referencing a particular variable representing the current date, (b) a policy regarding how mandatory fields are automatically populated, and (c) a policy regarding how names of tables maintained by storage medium 140 should be constructed. After server 330 stores policy data 180 in storage medium 140, processing proceeds to step 520.

In step 520, a user uses user interface 122 of client 120 to send a request to server 130 to examine a particular test script to determine if the particular test script complies with all the policies described by policy data 180. Upon server 130 receiving the request, a software process examines a particular test script to determine if the particular test script complies with all the policies described by policy data 180. In an embodiment, the software process responsible for examining the particular test script in step 520 may be implemented using server 330. In another embodiment, the software process responsible for examining the particular test script in step 520 may be implemented as a component of server 330 or a software entity in communication with server 330. For example, in step 520, server 330 may instruct a software process executing on the same computer as server 330 or a different computer as server 330 to examine a particular test script.

In an embodiment, in step 520, the software process may examine the particular test script without human assistance. The software process may be configured to scan a particular test script to see if any portion of the test script contains any objectionable content or performs any actions in conflict with a policy described by policy data 180. For example, if a policy described by policy data 180 prohibits the use of hardcoded dates or names, then the software process, in step 520, may scan the particular test script to determine whether the test script contains any hardcoded dates or names.

According to certain embodiments of the invention, the software process of step 520 may instruct client 120 to display a series of questions on user interface 122. The series of questions to be displayed on user interface 122 are intended to be answered by a user of client 120. The series of questions address whether the particular test script complies with each policy described by policy data 180.

In an embodiment, not all of the series of questions displayed on user interface 122 may be applicable to a particular test script. Therefore, in such an embodiment, the user may configure user interface 122 to indicate which of the series of questions are relevant to the particular test script. For example, the user may check a box or configure a similar user interface component associated with a particular question to indicate that the question is relevant to a particular test script. In a particular question is indicated to be relevant by a user, user interface 122 may be automatically updated to depict a list of values (LOV) or similar input mechanism to allow the user to select an answer for the particular question. To illustrate, if a user indicates that a question asking whether a particular rule was followed by the test script is relevant to a test script, then user interface 122 may be automatically updated to depict suggested or possible answers to the questions in a list of values (LOV). After viewing the series of questions displayed on user interface 122, the user may submit a set of answers to any relevant questions by submitting the answers, through user interface 122, to the software process of step 520. After performing step 520, processing proceeds to step 530.

In step 530, upon the software process determining that a particular test script does not comply with a particular policy described by policy data 180, the software process instructs client 120 to notify a user of client 120 by displaying, on user interface 122, a notice that identifies that the particular policy was not followed by the particular test script. For example, the particular policy that was not followed by the test script may be identified on user interface 122. If the user answered a series of questions displayed on user interface 122, then a visual indicator may be displayed by any question which was answered in a manner that indicates the particular test script violates a policy described by policy data 180. For example, a green light may be displayed next to questions which were answered in a manner indicating a policy was followed by the test script, and a red light may be displayed next to questions which were answered in a manner indicating a policy was not followed by the test script.

After learning which portions of a test script, if any, do not conform to the set of policies described by policy data 180, the user may correct those aspects prior to using the test script. By employing system 100 that performs the steps of flowchart 500, a business or organization may ensure that its employees or members are using a test script that conforms to the best practices and policies of the business or organization. In this way, the business or organization may avoid waste, inefficiency, and undue cost.

Implementing Mechanisms

Figure 6:
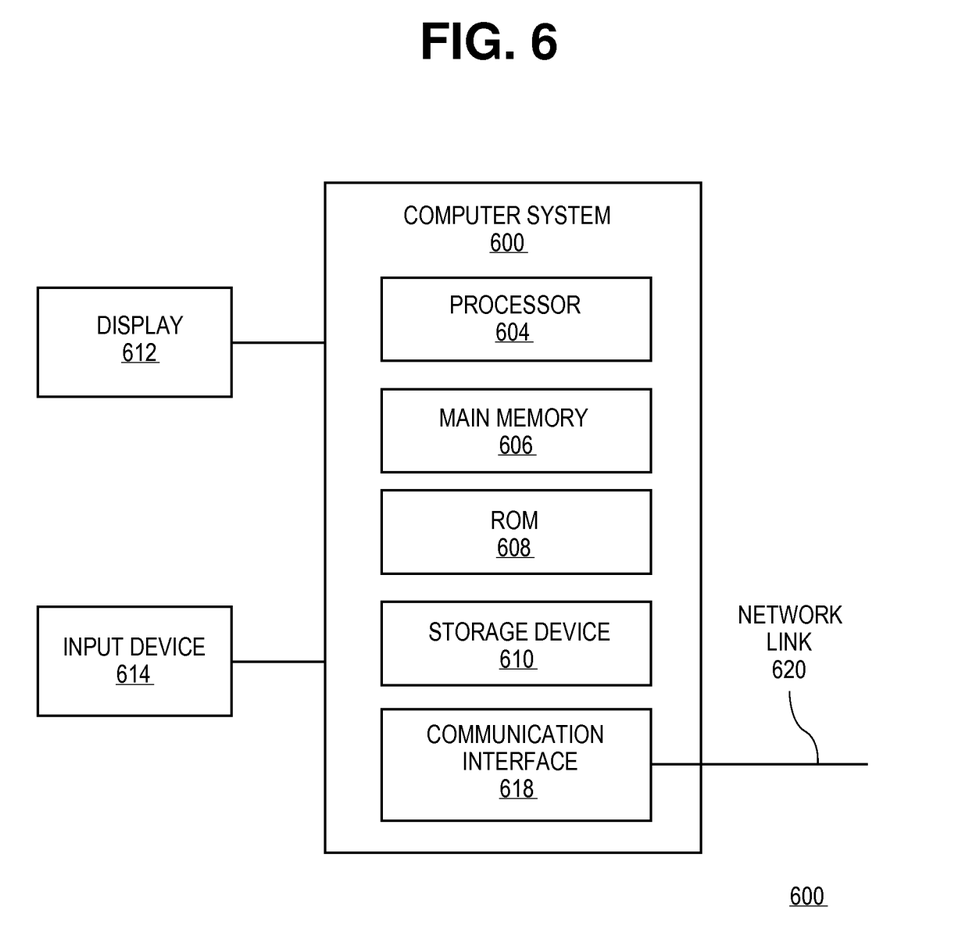
FIG. 6 is a block diagram that illustrates a computer system upon which an embodiment of the invention may be implemented.

In an embodiment, client 120, server 130, and storage medium 140 may each be implemented using a computer system. FIG. 6 is a block diagram that illustrates a computer system 600 upon which an embodiment of the invention may be implemented. In an embodiment, computer system 600 includes processor 604, main memory 606, ROM 608, storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device for storing static information and instructions for processor 604. A storage device 610, such as a magnetic disk or optical disk, is provided for storing information and instructions.

Computer system 600 may be coupled to a display 612, such as a cathode ray tube (CRT), a LCD monitor, and a television set, for displaying information to a user. An input device 614, including alphanumeric and other keys, is coupled to computer system 600 for communicating information and command selections to processor 604. Other non-limiting, illustrative examples of input device 614 include a mouse, a trackball, a light pen, a touch screen, or cursor direction keys for communicating direction information and command selections to processor 604 and for controlling cursor movement on display 612. While only one input device 614 is depicted in FIG. 6, embodiments of the invention may include any number of input devices 614 coupled to computer system 600.

Embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 604 for execution. For example, the instructions may initially be carried on a magnetic disk of a remote computer. The remote computer can load the instructions into its dynamic memory and send the instructions over a network link 620 to computer system 600.

Communication interface 618 provides a two-way data communication coupling to a network link 620 that is connected to a local network. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through a local network to a host computer or to data equipment operated by an Internet Service Provider (ISP).

Computer system 600 can send messages and receive data, including program code, through the network(s), network link 620 and communication interface 618. For example, a server might transmit a requested code for an application program through the Internet, a local ISP, a local network, subsequently to communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for assisting a user, the method comprising:
    identifying, using a processor, for each software tool in a plurality of software tools to be considered for performing a particular task, a plurality of characteristic values, wherein each of the plurality of characteristic values identifies a number that reflects how much said each software tool supports a particular characteristic in a plurality of characteristics;
    wherein the plurality of characteristics comprises:
        a first characteristic on interoperability of said each software tool with software applications from a first vendor;
        a second characteristic on interoperability of said each software tool with software applications from a second vendor; and
        a third characteristic on support provided by a company providing said each software tool;
    wherein the particular task is one of performing testing simulations, managing data persistently, or maintaining electronic records;
    computing a score for said each software tool, wherein the score is based on the characteristic values, of the plurality of characteristics;
    transmitting, to a client having a user interface, display data that describes how to render, on the user interface, a pictorial representation of the scores associated with the plurality of software tools, wherein the pictorial representation depicts a relative measure of how appropriate said each software tool is for the particular task;
    wherein each of the first characteristic, the second characteristic and the third characteristic is a child characteristic of another characteristic in the plurality of characteristics hereinafter referred to as parent characteristic;
    wherein a weight is associated with the child characteristic;
    in response to receiving input that changes the weight associated with the child characteristic, causing the display of the pictorial representation to be updated dynamically to reflect a change associated with the child characteristic thereby to cause information about the characteristic value associated with the parent characteristic to change.

2. The machine-implemented method of claim 1, wherein at least a portion of the plurality of characteristic values are received through the user interface.

3. The machine-implemented method of claim 1, wherein the display data is transmitted to the client in response to receipt of a request from the client, wherein at least a portion of the plurality of characteristic values are stored in a machine-readable medium prior to receipt of the request, and wherein the portion of the plurality of characteristic values are not provided by the client.

4. The machine-implemented method of claim 1, wherein the display data further describes how to render, on the user interface, one or more characteristic values, for each of the plurality of software tools, for the parent characteristic prior to receiving a request to display the one or more characteristic values for the child characteristic.

5. The machine-implemented method of claim 1, further comprising:
   receiving configuration data that assigns a weight to one or more characteristics of the plurality of characteristics, wherein the configuration data is received through the user interface, and wherein characteristic values are determined using the weight associated with each characteristic of the plurality of characteristics.

6. The machine-implemented method of claim 1, further comprising:
   receiving user input that identifies a particular task category in a plurality of task categories, wherein the particular task is in the particular task category; and
   in response to receiving the user input, determining a set of characteristics that are associated with the particular task category, wherein the set of characteristics identifies characteristics that a software tool may have in performing tasks in the particular task category.

7. The machine-implemented method of claim 1, further comprising:
   receiving user input that requests to add a new software tool to the plurality of software tools;
   obtaining a set of characteristic values associated with the new software tool; and
   causing the pictorial representation to be updated to depict the scores associated with the new software tool.

8. A non-transitory machine-readable storage medium storing one or more sequences of instructions for assisting a user in selecting a software tool, wherein execution by one or more computers of the one or more sequences of instructions causes:
   identifying, using a processor, for each software tool in a plurality of software tools to be considered for performing a particular task, a plurality of characteristic values, wherein each of the plurality of characteristic values identifies a number that reflects how much said each software tool supports a particular characteristic in a plurality of characteristics;
   wherein the plurality of characteristics comprises:
      a first characteristic on interoperability of said each software tool with software applications from a first vendor;
      a second characteristic on interoperability of said each software tool with software applications from a second vendor; and
      a third characteristic on support provided by a company providing said each software tool;
   wherein the particular task is one of performing testing simulations, managing data persistently, or maintaining electronic records;
   computing a score for said each software tool, wherein the score is based on the characteristic values, of the plurality of characteristics;
   transmitting, to a client having a user interface, display data that describes how to render, on the user interface, a pictorial representation of the scores associated with the plurality of software tools, wherein the pictorial representation depicts a relative measure of how appropriate said each software tool is for the particular task;
   wherein a characteristic in the plurality of characteristics is a child characteristic of another characteristic in the plurality of characteristics hereinafter referred to as parent characteristic;
   wherein a weight is associated with the child characteristic;
   in response to receiving input that changes the weight associated with the child characteristic, causing the display of the pictorial representation to be updated dynamically to reflect a change associated with the child characteristic thereby to cause information about the characteristic value associated with the parent characteristic to change.

9. The non-transitory machine-readable storage medium of claim 8 further comprising instructions to receive at least a portion of the plurality of characteristic values through the user interface.

10. The non-transitory machine-readable storage medium of claim 8 further comprising instructions to transmit the display data the client in response to receipt of a request from the client, wherein at least a portion of the plurality of characteristic values are stored in a machine-readable medium prior to receipt of the request, and wherein the portion of the plurality of characteristic values are not provided by the client.

11. The non-transitory machine-readable storage medium of claim 8, wherein the display data further describes how to render, on the user interface, one or more characteristic values, for each of the plurality of software tools, for the parent characteristic prior to receipt of a request to display the one or more characteristic values for the child characteristic.

12. The non-transitory machine-readable storage medium of claim 8, wherein execution of the one or more sequences of instructions further causes:
   receiving configuration data that assigns a weight to one or more characteristics of the plurality of characteristics, wherein the configuration data is received through the user interface, and wherein characteristic values are determined using the weight associated with each characteristic of the plurality of characteristics.

13. The non-transitory machine-readable storage medium of claim 8, wherein execution of the one or more sequences of instructions further causes:
   receiving user input that identifies a particular task category in a plurality of task categories, wherein the particular task is in the particular task category; and
   in response to receiving the user input, determining a set of characteristics that are associated with the particular task category, wherein the set of characteristics identifies characteristics that a software tool may have in performing tasks in the particular task category.

14. The non-transitory machine-readable storage medium of claim 8, wherein execution of the one or more sequences of instructions further causes:
   receiving user input that requests to add a new software tool to the plurality of software tools;
   obtaining a set of characteristic values associated with the new software tool; and
   causing the pictorial representation to be updated to depict the scores associated with the new software tool.

15. A system comprising one or more computers and at least one memory, the at least one memory comprising one or more sequences of instructions for assisting a user in selecting a software tool, wherein execution by the one or more computers of the one or more sequences of instructions causes:
   identifying, using a processor in the one or more computers, for each software tool in a plurality of software tools to be considered for performing a particular task, a plurality of characteristic values, wherein each of the plurality of characteristic values identifies a number that reflects how much said each software tool supports a particular characteristic in a plurality of characteristics;

wherein the plurality of characteristics comprises:

a first characteristic on interoperability of said each software tool with software applications from a first vendor;

a second characteristic on interoperability of said each software tool with software applications from a second vendor; and a third characteristic on support provided by a company providing said each software tool;

wherein the particular task is one of performing testing simulations, managing data persistently, or maintaining electronic records;

computing a score for said each software tool, wherein the score is based on the characteristic values, of the plurality of characteristics;

transmitting, to a client having a user interface, display data that describes how to render, on the user interface, a pictorial representation of the scores associated with the plurality of software tools, wherein the pictorial representation depicts a relative measure of how appropriate said each software tool is for the particular task;

wherein a characteristic in the plurality of characteristics is a child characteristic of another characteristic in the plurality of characteristics hereinafter referred to as parent characteristic;

wherein a weight is associated with the child characteristic;

in response to receiving input that changes the weight associated with the child characteristic, causing the display of the pictorial representation to be updated dynamically to reflect a change associated with the child characteristic thereby to cause information about the characteristic value associated with the parent characteristic to change.

16. The system of claim 15 wherein execution by the one or more computers of the one or more sequences of instructions further causes:

receiving at least a portion of the plurality of characteristic values through the user interface.

17. The system of claim 15 wherein execution by the one or more computers of the one or more sequences of instructions further causes:

transmitting the display data the client in response to receipt of a request from the client, wherein at least a portion of the plurality of characteristic values are stored in a machine-readable medium prior to receipt of the request, and wherein the portion of the plurality of characteristic values are not provided by the client.

18. The system of claim 15 wherein:

the display data further describes how to render, on the user interface, one or more characteristic values, for each of the plurality of software tools, for the parent characteristic prior to receipt of a request to display the one or more characteristic values for the child characteristic.

19. The system of claim 15 wherein execution by the one or more computers of the one or more sequences of instructions further causes:

receiving configuration data that assigns a weight to one or more characteristics of the plurality of characteristics, wherein the configuration data is received through the user interface, and wherein characteristic values are determined using the weight associated with each characteristic of the plurality of characteristics.

20. The system of claim 15 wherein execution by the one or more computers of the one or more sequences of instructions further causes:

determining a set of characteristics that are associated with the particular task category, wherein the set of characteristics identifies characteristics that a software tool may have in performing tasks in the particular task category.

21. The system of claim 15 wherein execution by the one or more computers of the one or more sequences of instructions further causes:

receiving user input that requests to add a new software tool to the plurality of software tools;

obtaining a set of characteristic values associated with the new software tool; and causing the pictorial representation to be updated to depict the scores associated with the new software tool.

* * * * *